(12) United States Patent
Zierle et al.

(10) Patent No.: US 6,830,277 B2
(45) Date of Patent: Dec. 14, 2004

(54) ARRANGEMENT FOR HOLDING BEVERAGE CANS OR SIMILAR RECEPTACLES IN THE INTERIOR OF VEHICLES

(75) Inventors: Matthias Zierle, Filderstadt (DE); Martin Frank, Muehlacker (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/264,251

(22) Filed: Oct. 4, 2002

(65) Prior Publication Data

US 2003/0075945 A1 Apr. 24, 2003

(30) Foreign Application Priority Data

Oct. 6, 2001 (DE) .......................................... 101 49 402

(51) Int. Cl.[7] .............................. B60N 3/10; B60R 7/06
(52) U.S. Cl. .................................... 296/37.12; 296/37.5
(58) Field of Search .............................. 296/37.2, 37.1, 296/37.5, 37.8, 70; 220/737, 477–478; 224/282, 926; 248/311.2; D12/419, 420; D7/619.1; 276/24.3, 24.34, 24.4

(56) References Cited

U.S. PATENT DOCUMENTS

| 4,955,571 | A | | 9/1990 | Lorence et al. | |
|---|---|---|---|---|---|
| D328,730 | S | * | 8/1992 | Kapp | 296/37.12 |
| 5,618,018 | A | * | 4/1997 | Baniak | 248/311.2 |
| 5,743,585 | A | * | 4/1998 | Pranger et al. | 296/37.17 |
| 5,800,005 | A | | 9/1998 | Arold et al. | |
| 5,860,630 | A | * | 1/1999 | Wildey et al. | 248/311.2 |
| 6,010,047 | A | * | 1/2000 | Osborn | 224/281 |
| 6,206,442 | B1 | * | 3/2001 | Breunig | 296/37.12 |
| 6,409,061 | B1 | | 6/2002 | Fischer et al. | |

FOREIGN PATENT DOCUMENTS

| DE | G 93 08 232 | 10/1993 | |
|---|---|---|---|
| DE | 4302948 | 8/1994 | |
| DE | 4318249 | * 12/1994 | ............ 248/311.2 |
| DE | 19534435 | 3/1997 | |
| DE | 195 34 436 | 3/1997 | |
| DE | 19717011 | 11/1998 | |
| DE | 19908130 | 8/2000 | |
| DE | 199 44 817 | 3/2001 | |
| DE | 10060926 | 6/2001 | |
| EP | 0 778 175 | 6/1997 | |
| JP | 07112643 | 5/1995 | |
| JP | 07394374 | 11/1995 | |
| JP | 20011088601 | 4/2001 | |

OTHER PUBLICATIONS

European Search Report.

* cited by examiner

Primary Examiner—D Glenn Dayoan
Assistant Examiner—H. Gutman
(74) Attorney, Agent, or Firm—Crowell & Moring LLP

(57) ABSTRACT

An arrangement for holding beverage cans or similar receptacles in the interior of vehicles is provided inside, in the upper area of a glove compartment, and comprises at least one receiving part for at least one beverage can. The receiving part is displaceable from a covered inoperative position inside the glove compartment into an operative position in front of the dashboard, and a swivellably disposed glove compartment cover is assigned to the glove compartment. When the receiving part is displaced into the operative position, the arrangement does not require the opening of the glove compartment cover. The glove compartment cover extends only approximately to the lower edge of the arrangement, and the arrangement comprises at least one separate flap which has a low height and can be operated separately from the glove compartment cover.

19 Claims, 4 Drawing Sheets

ARRANGEMENT FOR HOLDING BEVERAGE CANS OR SIMILAR RECEPTACLES IN THE INTERIOR OF VEHICLES

This application claims the priority of German Patent Document No. 101 49 402.5, filed Oct. 6, 2001.

BACKGROUND AND SUMMARY OF THE INVENTION

The invention relates to an arrangement for holding beverage cans or similar receptacles in the interior of vehicles, the arrangement being provided in an upper area of a glove compartment provided in a dashboard and comprising at least one receiving part for at least one beverage container, the receiving part being displaceable from a covered inoperative position inside the glove compartment into an operative position in front of the dashboard, a swivellably disposed glove compartment cover being assigned to the glove compartment.

From German Patent Document DE 43 02 948 A1, it is known to provide inside, specifically in the upper area of a glove compartment, an arrangement for holding beverage cans or similar receptacles, in which case the arrangement has at least one receiving part for at least one beverage can. The receiving part is supported on a carriage which interacts with a guiding part arranged inside the glove compartment. In the retracted inoperative position of the arrangement, the latter and the glove compartment are covered by a one-piece glove compartment cover. This system has the disadvantage that the arrangement has a relatively high-expenditure construction and that, before the displacement of the receiving part of the arrangement into the operative position, the relatively large glove compartment cover must always be opened. As a result, the leg space for the front seat passenger is limited and the aesthetic overall appearance of the vehicle interior is impaired. Because of the linear drawer-type extension movement, the receiving part of the arrangement in the operative position would, in addition, be situated in the inflating area of a front passenger air bag arranged in the dashboard.

It is an aspect of certain preferred embodiments of the invention to further develop an arrangement of the initially mentioned type such that it has a simple cost-effective construction and that the glove compartment cover does not have to be opened up for moving out the receiving part.

This aspect is achieved in certain preferred embodiments in that the glove compartment cover extends only approximately to a lower edge of the arrangement, and in that the arrangement comprises at least one separate flap which has a low height and can be operated separately from the glove compartment cover. Additional characteristics advantageously further developing the invention are contained in other preferred embodiments.

Principal advantages achieved by way of providing a separate flap in front of the arrangement are that the opening of the glove compartment cover will not be necessary for displacing the arrangement into the operative position.

The flap, which has a low height, even in its open position, does not project into the leg space of a vehicle occupant and does not interfere with the appearance. The arrangement, which is made only of a housing, a flap and at least one swivellably arranged receiving part, has a simple construction and can be produced at reasonable cost. By way of the skillful selection of the axis of rotation and the bent shape of the receiving part, it is also ensured that, even in the operative position of the receiving part or parts, the inflating range of the front passenger air bag is maintained.

Other objects, advantages and novel features of the present invention will become apparent from the following detailed description of the invention when considered in conjunction with the accompanying drawings.

DETAILED DESCRIPTION OF THE DRAWINGS

Figure 1:
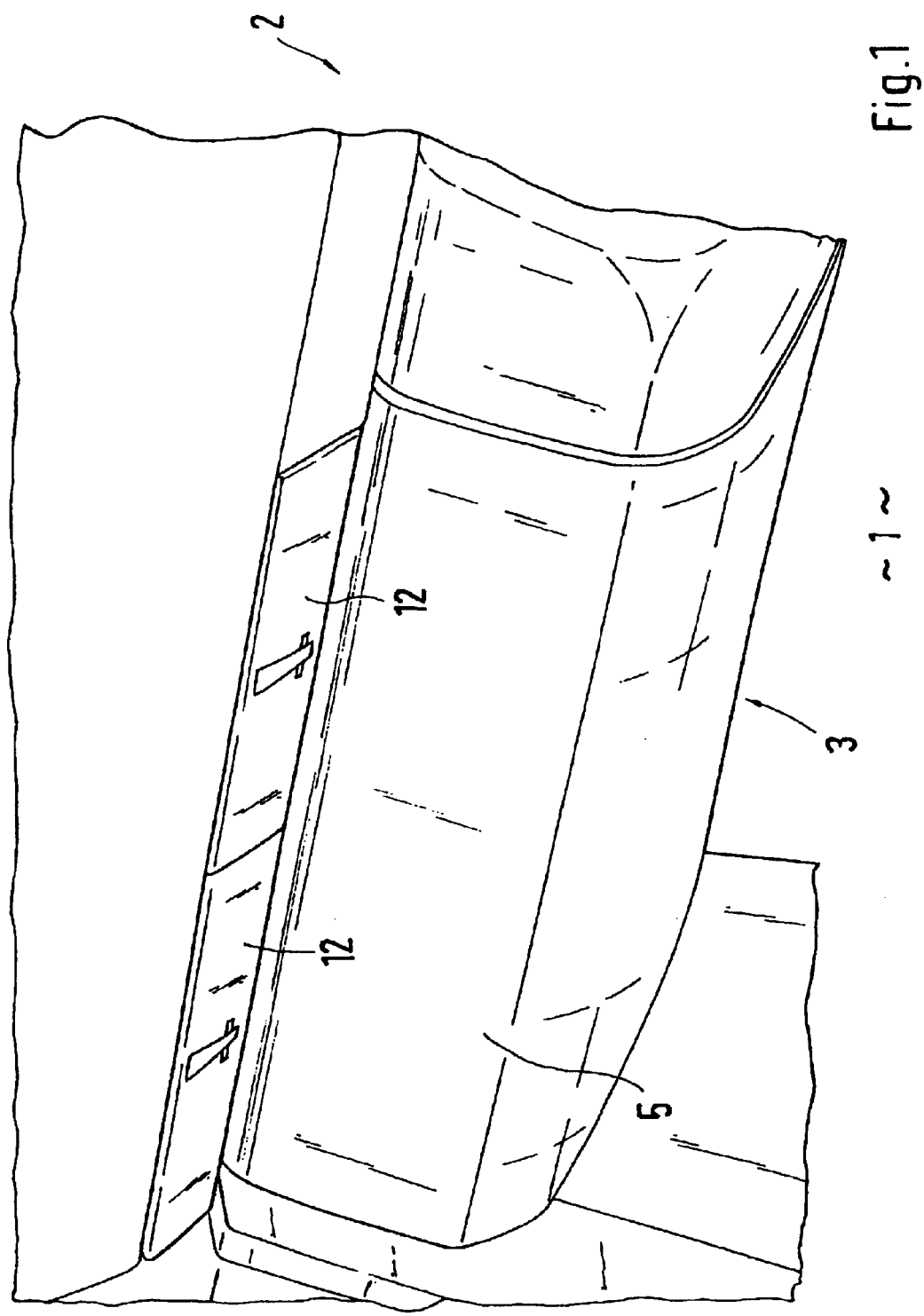
FIG. 1 shows a perspective view diagonally from the front of a dashboard having a glove compartment and an arrangement for receiving beverage cans, in the retracted inoperative position.
Figure 4:
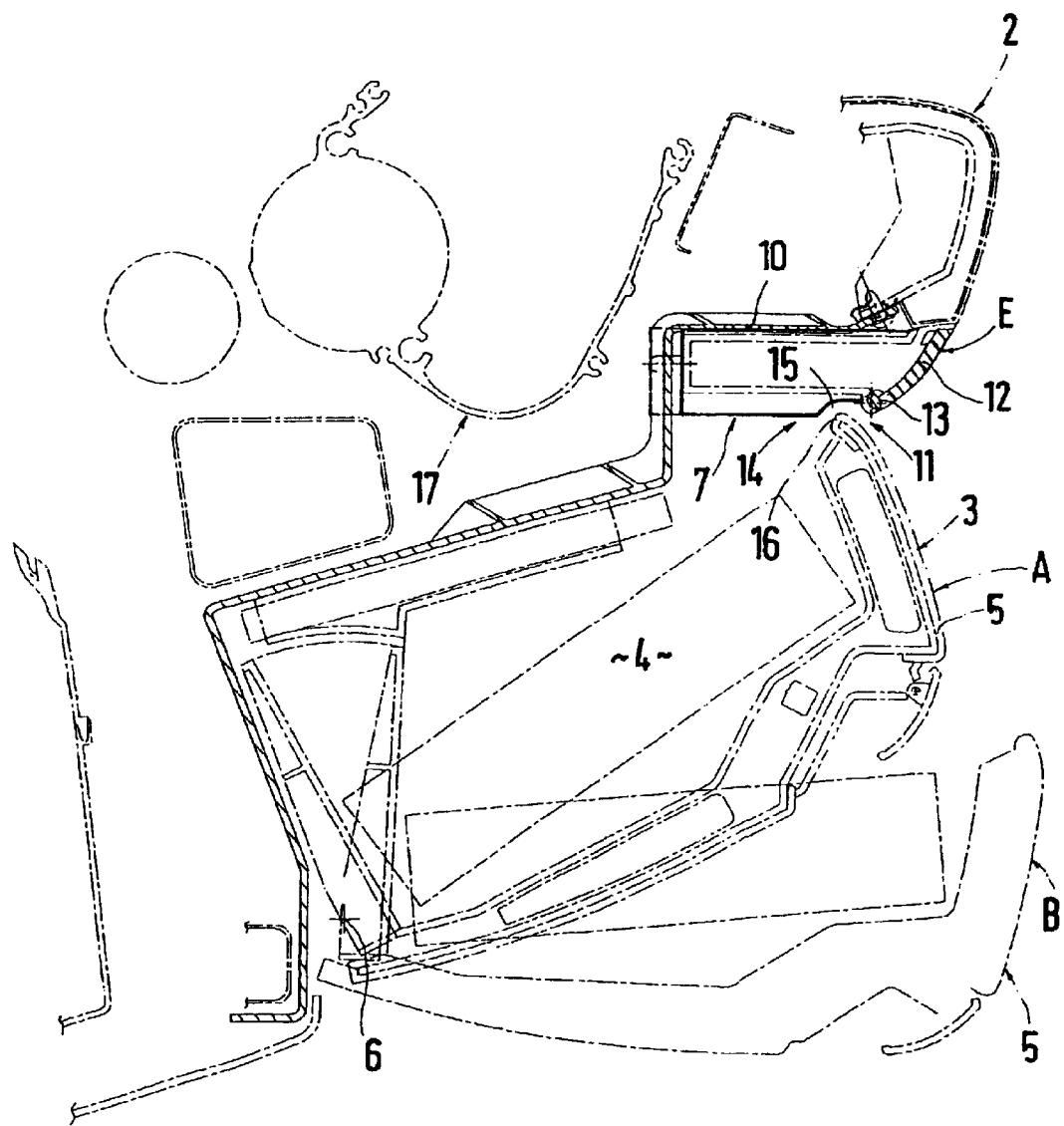
FIG. 4 shows a sectional view, in which case the arrangement is shown in the covered inoperative position and the glove compartment cover is shown once in the closed position and, in a dash-dotted manner, in the open position.

FIG. 1 shows a dashboard 2 arranged in the interior 1 of a vehicle, which dashboard 2 has a glove compartment on the front passenger side. The glove compartment 3 is made, for example, of a plastic material and, as seen in FIG. 4, encloses a storage space which is accessible by way of a glove compartment cover 5 on the frontal side of the glove compartment 3.

In a lower area, the glove compartment cover 5 can be swivelled about a transversely extending, approximately horizontally aligned axis 6 of rotation and can be displaced from a closed position A downward into an open position B and vice-versa.

Figure 3:
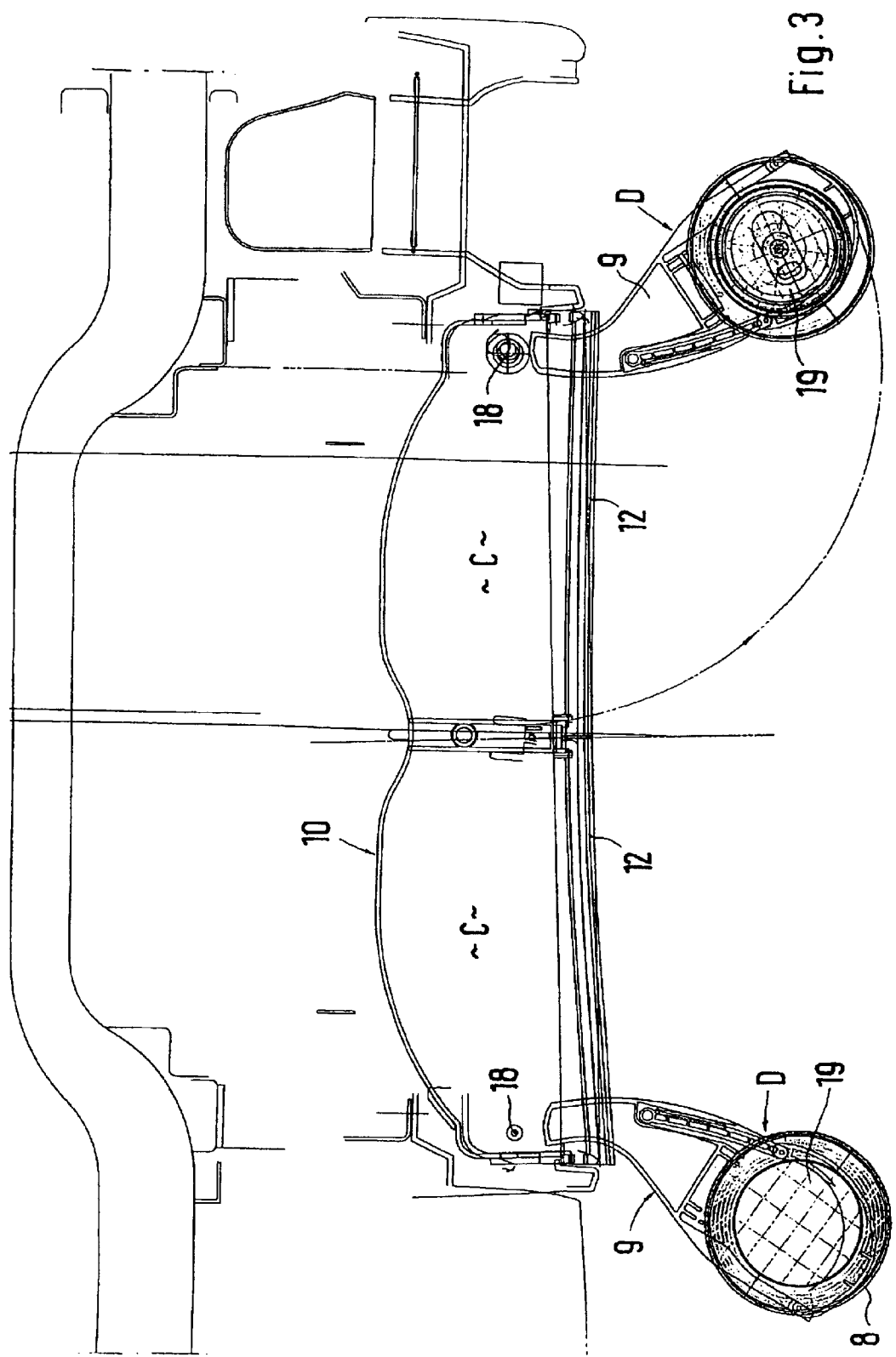
FIG. 3 shows a top view of the arrangement, in which the receiving parts are shown in their operative position.

Inside the glove compartment, in its upper area, an arrangement 7 is provided for holding beverage cans 8 or similar receptacles. The arrangement 7 has at least one receiving part 9 for at least one beverage can 8. The receiving part 9 can be displaced from a covered inoperative position C, which is not shown in detail, inside the glove compartment 3 or a housing 10 of the arrangement 7 into an operative position D situated in front of the dashboard 2, and vice-versa as seen in FIG. 3.

In the area of the arrangement 7, the glove compartment 3 has a smaller depth in the longitudinal direction of the vehicle than in an area of the storage space 4 situated underneath.

According to certain preferred embodiments of the invention, the glove compartment cover 5, which is swivellably linked on its underside, extends only approximately to the lower edge 11 of the arrangement 7, and the arrangement 7 has at least one separate flap 12 which can be operated separately from the glove compartment cover 5.

Preferably at its lower end, the flap 12 is swivellably about a transversely extending, approximately horizontally aligned axis 13 of rotation disposed on the housing 10 of the arrangement 7 and can be moved from a closed position E into a downward-folded open position and vice versa.

According to FIG. 4, the flap 12—in the vertical direction—has a relatively low height in comparison to the glove compartment cover 5 and forms virtually a narrow transversely extending decorative trim within the dashboard 2 which, with respect to the color and the grain, may differ from the area of the dashboard 2 situated above or below as seen in FIG. 1.

Figure 2:
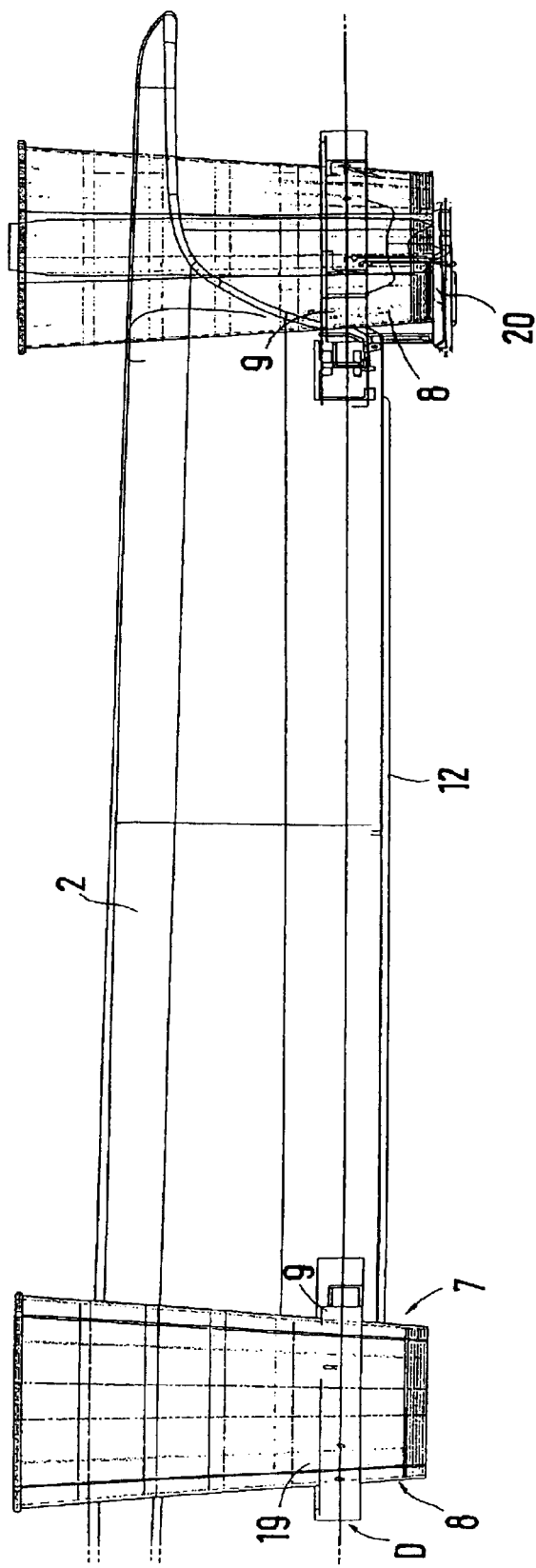
FIG. 2 shows a partial view from the front of the front-passenger-side partial area of a dashboard having an arrangement for receiving beverage cans, the receiving parts taking up their operative position.

The arrangement 7 as seen in FIGS. 1 and 2 comprises two separate receiving parts 9 in front of the front passenger seat, in which case both receiving parts 9 may be arranged in a joint housing 10 or in two separate housings 10. Either a joint flap 12 is assigned to the two receiving parts 9 or each receiving part 9 interacts with a separate flap 12; that is, in the case of this variant, two flaps 12 are provided side-by-side as shown in FIG. 1.

The housing 10 of the arrangement 7 has an upward-projecting profiled shaped-out section 15 on the underside 14, adjacent to the axis 13 of rotation, into which an upper edge 16 of the glove compartment cover 5 projects in sections in its closed position A. A schematically outlined front passenger air bag module 17 is provided above the glove compartment 3 inside the dashboard 2.

So that the inflating area of the front passenger air bag is ensured also in the operative position D of the arrangement 7, the two receiving parts 9 are each disposed about a laterally exterior, approximately vertically extending axis 18 of rotation at the housing 10. Together with the—viewed in the top view—curved, outward-directed contour of the receiving parts 9, it is ensured that, in the operative position D, the two receiving parts 9 are situated laterally outside the possible inflating area of the front passenger air bag as seen in FIG. 3.

On its top side, each receiving part 9 has at least one circular opening 19 for introducing the beverage can 8. In addition, the receiving part 9 has a lower placing surface 20 for the beverage can 8, the lower placing surface 20 being constructed to be rigid or capable to be folded out in the downward direction. The two receiving parts 9 preferably have spring-loaded construction; that is, after the opening of the flap 12, the receiving parts 9 swivel automatically from the inoperative position C into their operative position D. In their swivelled-out operative position D, the receiving parts 9 are locked by a device not illustrated in detail, such as a ball catch or the like. The returning of the receiving parts 9 into the covered inoperative position C may take place either manually or automatically.

The dashboard 2 may be constructed in one or several pieces. In the embodiment shown, the dashboard 2 is composed of an instrument panel bottom part and an instrument panel top part, the arrangement 7 or housing 10 being fastened to the instrument panel top part.

In the area of the circular opening 19 of each receiving part 9, a device may be provided which is not shown in detail and which permits the receiving of beverage cans 8 of different diameters, adapting to different beverage cans. As a result of a slight pressure from the outside onto the flap 12, the latter is opened up, and subsequently an automatic moving-out of the at least one receiving part 9 takes place into the swivelled-out operative position D.

The arrangement according to the invention for holding beverage cans or similar receptacles may be used as an identical part for left-hand drive as well as for right-hand drive vehicles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An arrangement for holding at least one beverage container in an interior of a vehicle, the arrangement being provided in an upper area of a glove compartment provided in a dashboard and comprising at least one receiving part for the at least one beverage container, the receiving part being displaceable from a covered inoperative position inside the glove compartment into an operative position in front of the dashboard, and a swivellably disposed glove compartment cover being assigned to the glove compartment, wherein the glove compartment cover extends only approximately to the lower edge of the arrangement, and wherein the arrangement comprises at least one separate flap which has a low height and can be operated separately from the glove compartment cover.

2. The arrangement according to claim 1, wherein the arrangement has a housing receiving the at least one receiving part, the at least one flap being pivotally linked to said housing.

3. The arrangement according to claim 1, wherein two of said receiving part are provided, the two receiving parts being mutually separately operable.

4. The arrangement according to claim 3, wherein each of the receiving parts is assigned at least one of said separate flap.

5. The arrangement according to claim 1, wherein each of said at least one receiving part is disposed about a laterally exterior, approximately vertically extending axis of rotation, the receiving part having a shape such that, in the operative position, the beverage container is situated laterally next to an inflating area of a front passenger air bag arranged in the dashboard.

6. The arrangement according to claim 2, wherein each of said at least one receiving part is disposed about a laterally exterior, approximately vertically extending axis of rotation, the receiving part having a shape such that, in the operative position, the beverage container is situated laterally next to an inflating area of a front passenger air bag arranged in the dashboard.

7. The arrangement according to claim 3, wherein each of said at least one receiving part is disposed about a laterally exterior, approximately vertically extending axis of rotation, the receiving part having a shape such that, in the operative position, the beverage container is situated laterally next to an inflating area of a front passenger air bag arranged in the dashboard.

8. The arrangement according to claim 1, wherein a housing of the arrangement has an upward-projecting shaped-out section on an underside adjacent to an axis of rotation of the flap, into said shaped-out section an upper edge of the glove compartment cover projects in sections in a closed position.

9. The arrangement according to claim 2, wherein the housing of the arrangement has an upward-projecting shaped-out section on an underside adjacent to an axis of rotation of the flap, into said shaped-out section an upper edge of the glove compartment cover projects in sections in a closed position.

10. A container holder assembly for a vehicle having a glove compartment with a swivellably disposed glove compartment cover, and being arranged in an upper area of the glove compartment, comprising:

a separate pivotable flap having a low height profile in a dashboard and operable separately from the glove compartment cover, a receiving part for a container, the receiving part being displaceable from a stowed inoperative position inside the assembly into an operative position in front of the dashboard, and a lower edge extending approximately to the glove compartment cover.

11. The assembly according to claim 10, wherein the receiving part has a shape in which when the receiving part is in the operative position, the container operatively located in the receiving part is located laterally adjacent to an inflating area of a front passenger airbag arranged in the dashboard.

12. A method of making an assembly for holding at least one receptacle in a vehicle, comprising:

arranging the assembly in an upper area of a glove compartment having a swivellably disposed glove compartment cover which extends only approximately to a lower edge of the assembly, providing a separate pivotable flap for the assembly, the flap having a low height and being operable separately from the glove compartment cover, and arranging a receiving part for the at least one receptacle to be operatively displaceable from a covered inoperative position inside the glove compartment into an operative position in front of a dashboard.

13. An arrangement for holding at least one beverage container in an interior of a vehicle, the arrangement being provided in an upper area of a glove compartment in a dashboard and comprising at least one receiving part for the at least one beverage container, the receiving part being displaceable from a covered inoperative position behind the dashboard into an operative position in front of the dashboard, and at least one pivotable flap which serves to cover the receiving part while it is in the covered inoperative position, said pivotable flap being operative independent of a glove compartment cover.

14. The arrangement of claim 13, further comprising a housing defining a space for holding the receiving part in the inoperative position.

15. The arrangement of claim 14, wherein said flap is pivotably linked to said housing.

16. The arrangement of claim 14, wherein said housing has an upward-projecting shaped-out section adjacent to an axis of the flap.

17. The arrangement of claim 13, wherein said receiving part, in the operative position, is situated outside an inflating area of a front passenger air bag.

18. The arrangement of claim 13, wherein said receiving part is rotatably linked to said housing about an approximately vertical axis.

19. The arrangement of claim 13, wherein said receiving part is spring-loaded such that when the flap is opened, the receiving part moves automatically from the inoperative position to the operative position.

* * * * *